April 7, 1942.  P. J. HARRINGTON  2,279,043
FLUID LEVEL DEVICE
Filed June 30, 1939
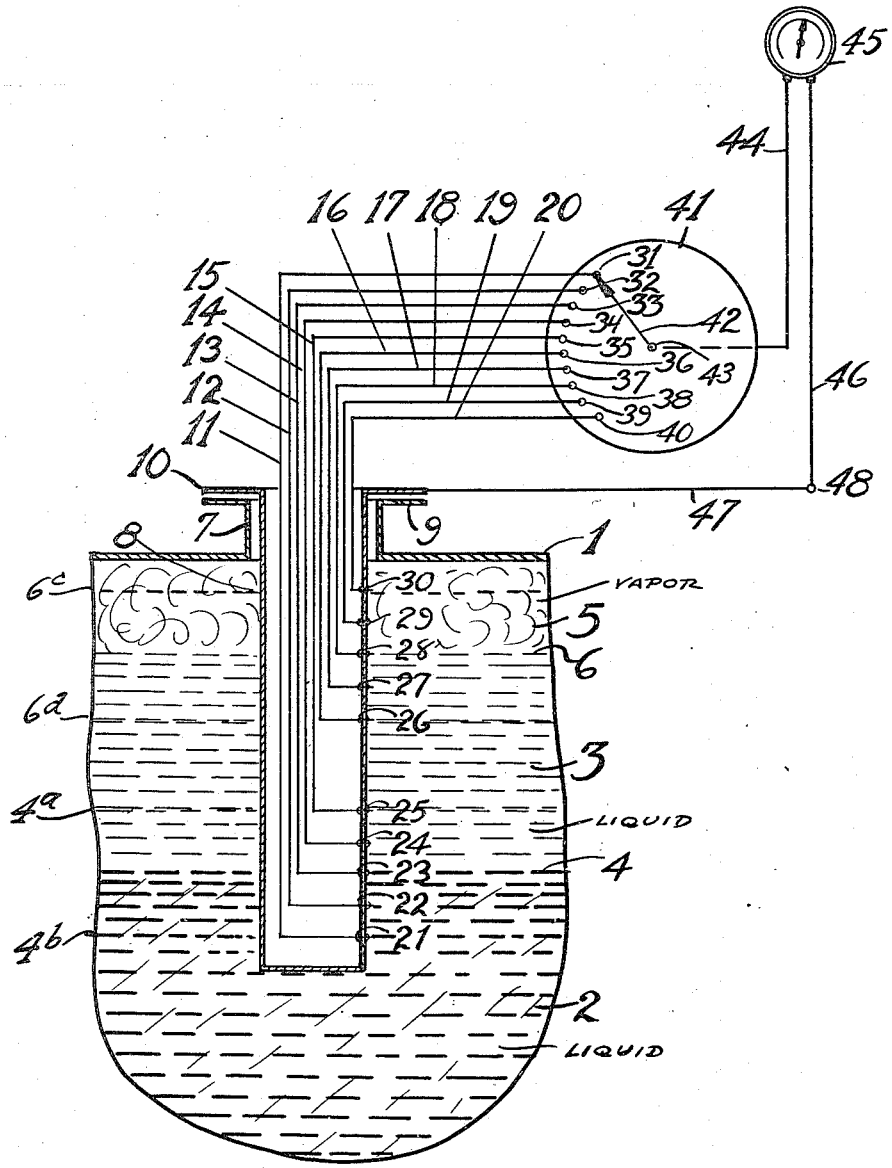
Paul J. Harrington Inventor
By J. K. Small Attorney Patented Apr. 7, 1942

2,279,043

UNITED STATES PATENT OFFICE 2,279,043

FLUID LEVEL DEVICE

Paul J. Harrington, Fanwood, N. J., assignor to Standard Oil Development Company, a corporation of Delaware Application June 30, 1939, Serial No. 282,177

2 Claims. (Cl. 73—295)

The present invention relates to apparatus for determining the respective levels of two or more fluids in a container, and especially in a pressure vessel. More particularly, it relates to apparatus for determining the respective levels of two or more substantially immiscible, heated fluids in a container through which they pass as separate layers.

In many processes, it is desirable to determine, record or control the level of a liquid or a series of liquids in a process vessel. Conventional means for these purposes are often unsatisfactory, as for example when handling corrosive or solidifiable materials such as acids or tars. Trycocks are dangerous, gauge glasses become coated and opaque, while floats or other internally disposed mechanisms are subject to other defects as well as being extremely inaccessible and their failure not readily apparent.

It has been found that when for example, a heated liquid is confined in a non-boiling condition in a partially filled container, there is a temperature differential between the liquid body and the body of vapor or gas above it, and further, that at the liquid-vapor interface the temperature will differ from that of either the body of gas or the body of liquid. When a liquid and a gas are heated in a drum, the resistance to heat flow at the liquid-gas interface, differences in rates of gas and liquid introduction and removal, differences in the surfaces of gas and liquid exposed to the heating surfaces, and differences in thermal conductivity, specific heat, viscosity of the fluids, and the like, all tend to produce differences in temperature between the gas and liquid phases. This difference may be large or small, and may vary in magnitude with time, but a differential will be maintained in any continuously flowing system. Analogously, a temperature differential will exist between two layers of immiscible liquids, and it is an object of this invention to provide apparatus to utilize such temperature differentials to indicate fluid levels in a closed container.

The invention, and its objects, may be fully understood from the following description, when read in conjunction with the accompanying drawing, in which The figure is a semi-diagrammatic showing of a vertical section through a fluid container showing an embodiment of the invention.

Referring to the drawing, the container 1 is a process vessel into which has been discharged a mixture of heated, substantially immiscible fluids, such as sulfuric acid, acid tar including vapors released therefrom, which have stratified in the container 1 to form layers. The numerals 2 and 3 designate the liquid layers, having interfacial contact at 4, and the numeral 5 designates a vapor from the heated liquids, having interfacial contact with the liquid 3, as at 6. For the purpose of this description, it is to be considered desirable that each of the interfacial levels 4 and 6 be maintained substantially within the limits indicated by the dotted lines 4a and 4b, and 6c and 6d, respectively. For the purpose set forth, the container 1 is provided with a port or opening at 7 through which a tube 8 is inserted to such depth in the container as may be necessary to explore the condition of the materials in the vessel. The tube 8 is closed at the lower end and is preferably of a corrosion resistant metal or other substance having suitable properties. As shown, the tube extends substantially below the interface of liquids 2 and 3 to permit measurements within the predetermined fluctuation limits, but the tube may be disposed from top to bottom of the container if desired. A fluid and pressure tight seal should be established between the port 7 and tube 8 and may be accomplished in any suitable manner as by flanges 9 and 10, respectively.

Within the tube, at spaced intervals along one wall, a series of insulated wires 11, 12, 13, 14, 15, 16, 17, 18, 19 and 20 are joined to the tube 8, as at 21, 22, 23, 24, 25, 26, 27, 28, 29 and 30 respectively, to form junctions which will be highly sensitive to temperature conditions in the fluids beyond the tube. The wires should be of a metal dissimilar to that of the tube, and the junctions may be formed by drilling and then welding or brazing the connections. As shown, the connections are grouped in two sets to provide for a specific, anticipated range of fluctuation in the interfaces 4 and 6, but under certain conditions, it may be desirable to provide for wire junctions in closely spaced relation from the bottom to the top of the tube 8.

The wires 11 to 20 inclusive extend outwardly from the tube 8 to a point usually removed from the container, and are there individually terminated at the several switch contact points 31, 32, 33, 34, 35, 36, 37, 38, 39 and 40 respectively, on the dial or selector switch 41. The switch 41 has a dial arm or movable contact 42, pivoted at 43. A wire 44 of the same metal as that of lines 11 to 20 inclusive, connects the dial arm 42 at 43 to an instrument for determining differences in electric potentials, such as a potentiometer 45. The instrument 45 is also connected to the tube 8 by means of wires 46 and 47, brought together at a constant temperature junction 48, and the wire 47 connected to the tube 8. The wire 46 should be of the same metal as the line 44 and lines 11 to 20 inclusive, while that of the wire 47 should be of the same metal as the tube 8. If desired, a multi-point temperature recorder may be substituted for the multi-point or dial switch set forth above.

In operation as a simple liquid level indicator, an operator may determine the level of any interface by simply moving the dial arm 42 over the contact points 31 to 40 inclusive, to obtain a temperature reading for any of the couple points 11 to 20 inclusive. As previously indicated, under operating conditions there will be an appreciable difference in the temperature reading for any of the three fluids 2, 3 and 5, and at each interface 4 or 6, the temperature will be at an intermediate point. The intermediate readings, for example a reading taken on the couple point 23, by indicating the upper limit of the lower fluid layer or the lower limit of the upper fluid layer, permit the operator to adjust inlet or outlet valves in such manner as to maintain or restore a desired relationship between the stratified materials.

Example 1

An intermediate reading is obtained at couple point 24 through wire 14 and contact point 34. At the same time, an intermediate reading is obtained at the couple point 29 through wire 19 and contact point 39. Obviously the distance between interface 4 and 6 has not changed although each is higher by one couple point than shown in the drawing. Therefore, the indication obtained is that the quantity of fluid in the layer 2 has increased by an amount sufficient to raise its level one couple point above the original level. An operator may, if desired, restore the level of the layer 2 by suitable manipulation of outlet or inlet valves.

Example 2

An intermediate reading is obtained at couple point 22, through the wire 12 and contact point 32. At the same time an intermediate reading is also obtained at the couple point 28 through wire 18, and contact point 38. These readings indicate that while the upper level of the fluid 2 has been lowered by one couple point, the upper level of the fluid 3 has not changed. Obviously there has been an increase in the quantity of the fluid 3 which has compensated for the decrease in quantity of the fluid 2. The desired levels may be maintained by reducing the outflow of fluid 2 while increasing that of fluid 3, or by increasing the in-flow of fluid 2 while decreasing that of fluid 3.

Other possible variations of the fluid levels are apparent, but in any situation encountered the operation of the indicating means, and the method of correction should be apparent from the foregoing examples.

It should be obvious that the disclosure is capable of considerable variation within the scope of the concept set forth, and it should not be considered as limited by the foregoing specific embodiment, described for the purpose of illustration, but only by the appended claims.

I claim:

1. A thermoscopic, fluid-level indicating system, comprising a metal casing, closed at one end; a plurality of metal couple points disposed in spaced relation longitudinally of the casing wall; said couple points including wires of different metal from that of said metal casing, a thermo-electric circuit including said casing and couple points; a thermo-electric meter disposed in said circuit; and switch means connected in the circuit in series with the meter to selectively establish the circuit through individual couple points.

2. An apparatus for determining the level of interfacial contact between two heated, stratified fluids in a container therefor, comprising a container having an opening in one wall; a hollow thermoscope metal tube extending through said opening, vertically of the container, and opening outwardly; a plurality of thermo-electric conductor elements extending into said tube and connected thereto, interiorly of the sidewalls, at couple points disposed longitudinally of the tube; said conductor elements being of different metal from said metal tube, a multi-point switch, exteriorly of the container, severally connected to the outer ends of said conductor elements; and a thermo-electric conductor element connected to said tube exteriorly of the outer end, and to said switch, providing for a plurality of individual thermo-electric circuits; and thermo-electric current-indicator means connected in series with the switch by means of the exteriorly disposed conductor element.

PAUL J. HARRINGTON.